June 24, 1969 JEAN-PIERRE BIET ET AL 3,452,206

PHOTO-DIODE AND TRANSISTOR SEMICONDUCTOR RADIATION DETECTOR WITH THE PHOTO-DIODE BIASED SLIGHTLY BELOW ITS BREAKDOWN VOLTAGE

Filed June 15, 1967 Sheet 1 of 3

United States Patent Office 3,452,206

Patented June 24, 1969

3,452,206
PHOTO-DIODE AND TRANSISTOR SEMICONDUCTOR RADIATION DETECTOR WITH THE PHOTO-DIODE BIASED SLIGHTLY BELOW ITS BREAKDOWN VOLTAGE

Jean-Pierre Biet, Saulx-les-Chartreux, and Jacques L. Benoit, Paris, France, assignors to Compagnie Generale d'Electricite, Paris, France Filed June 15, 1967, Ser. No. 646,224
Claims priority, application France, June 15, 1966, 65,637
Int. Cl. H01j 39/00, 39/12
U.S. Cl. 250—211 9 Claims

ABSTRACT OF THE DISCLOSURE

A radiation detector comprising a semiconductor photo-diode with an inversely polarized p-n junction, connected between the base and the collector of an amplifying transistor. The base-collector junction similarly is inversely polarized and has a breakdown voltage which is higher than the breakdown voltage of the junction of the photo-diode. The point of operation of the detector is set so that the supply potential is just below the breakdown voltage of the photo-diode.

The present invention relates to radiation detectors comprising semiconductors, and a method for manufacturing them.

It is a well known fact that the detection of a radiation whose wavelength lies between infra-red and ultraviolet may be performed by means of photo-electric cells, photo-diodes, or photo-transistors comprising semiconductors, or else by means of photo-resistances. The principle is equally known of the detection of visible or invisible luminous radiations, by means of p-n type of semiconductor junctions polarized in reverse by a voltage close to the breakdown voltage but still lower than the same. A polarization of this kind causes the formation of a region of spatial charge in the semiconductor material of which the p-n junction has been made. When a luminous radiation penetrates into the region of spatial charge of a junction of this nature, pairs of electron holes are created therein by photo-electric effect, and each carrier thus created gives rise to the creation of secondary carriers by the well known action of the phenomenon of multiplication of carriers in the inversely polarized junctions.

Compared to a photo-resistance for example, a photo-diode of the above described nature comprises the advantage of greater speed and higher sensitivity, by virtue of the multiplication of the carriers, as has already been stated. The photo-diodes generally are associated with an amplifier intended to supply a signal at sufficiently high voltage to be usable in the different applications contemplated. When the intensity of the flux of luminous radiation varies at a high frequency, the problems of impedance matching between the photo-diode and the amplifier become more difficult and entail a reduction in sensitivity.

The present invention relates to a radiation detector comprising a photo-detector diode with a p-n junction associated with a transistor whose emitter-base diode is forwardly polarized and whose base-collector along with the p-n junction of the photo-diode is inversely polarized, the p and n layers of the photo-diode being connected, respectively to the base and to the collector of the said transistor.

This radiation detector is characterized in that the breakdown voltage of the base-collector junction of the transistor is higher than that of the p-n junction of the photo-diode, so that this latter operates at a so-called "avalanche" rate. The supply voltage applied between the emitter and collector of the transistor and which is equally applied to the p-n junction of the photo-diode, is of the order of magnitude of the breakdown voltage of the p-n junction of the photo-diode. In these conditions, any partial conduction of the photo-diode feeds the transistor with base current, and causes it to become partially conducting, but with a current amplification equal to current gain of the transistor connected in an amplifier arrangement with a common emitter, which allows of a current gain of several tens of units in comparison with the conventional arrangement.

According to another important feature of the invention, the photo-diode and the transistor are integrated into one and the same semiconductive substrate, and the emitter-base junction of the transistor and the p-n junction of the photo-diode are established at the same time, so that these two junctions thus have the same breakdown voltages but reversed or in opposition. This breakdown voltage can be made to be much lower than the breakdown voltage of the base-collector of the transistor if one applies the technique of double diffusion for the production of such an integrated device.

It is also possible to protect the surfaces of the said integrated device by means of a thin layer of oxide which will easily be traversed by the luminous radiation.

The integration of the photo-diode and of the transistor, by eliminating external connections between these elements improves the performance factors in respect to frequency of the integrated device, and renders it possible to secure reduced sensitivity to interference phenomena. Such integrated devices moreover lend themselves particularly well to use in matrixes comprised by a multiplicity of such devices.

The invention will now be described with reference to the accompanying drawings, which show embodiments of the invention, but in no restrictive sense.

Figure 1:
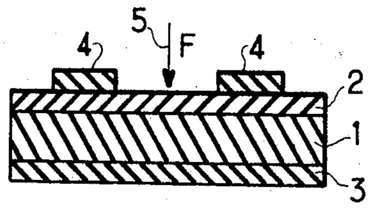
FIGURE 1 is a section through one known form of photo-diode.

FIGURE 1 illustrates a photo-diode of a type known per se, consisting of a junction of the p-n type produced in a semiconductive substratum such as silicon for example. 1 denotes a layer of silicon of conductivity p type, 2 denotes a layer of the conductivity n type obtained by diffusion of impurities of the n type into the silicon, 3 denotes an electrical connection to the silicon layer 1, and 4 denotes electrical connections to the layer 2. The arrow 5 shows the direction of the incident radiation impinging on the photo-diode.

Figure 2:
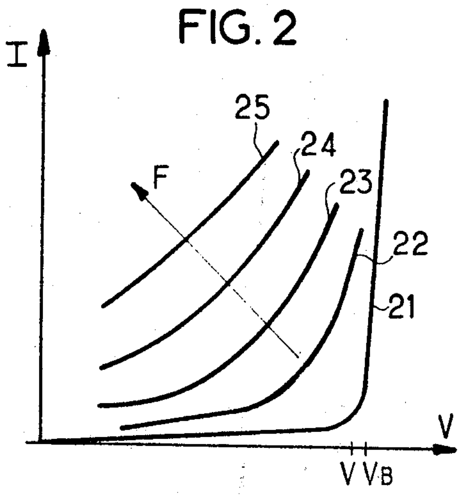
FIGURE 2 shows a series of curves, illustrating the performance of the device of FIGURE 1.

FIGURE 2 illustrates a family of "current-voltage" curves produced as a function of the illumination of a photo-diode detector of the kind shown in FIGURE 1 whose p-n junction is inversely polarized. 21 is the characteristic of the inversely polarized diode or p-n junction in the absence of any radiation: it represents the so-called darkness characteristic. 22, 23, 24 and 25 are the current-voltage curves of the p-n junction for different degrees of illumination, these being marked in ascending order. In this figure $V_B$ represents the value of the breakdown voltage of the diode and V the inverse polarization voltage, very close to but less than $V_B$ which is applied to the p-n junction.

Figure 3:
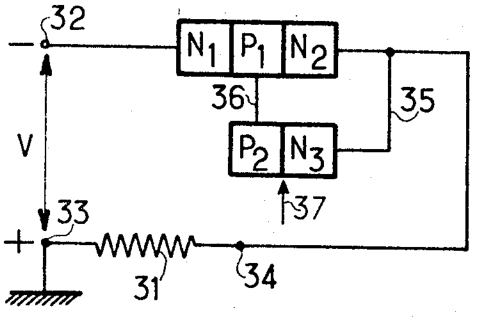
FIGURE 3 is a circuit diagram of a detector according to the invention incorporating the device of FIGURE 1 and a transistor.

FIGURE 3 is a schematic circuit diagram illustrating the connections between a photo-diode, a transistor and a load circuit according to the invention. $N_1$, $P_1$, $N_2$ respectively, mark tthe emitter, the base and the collector of a NPN junction transistor, and $P_2$ and $N_3$ marking the p and n layers of the photo-diode. A connection 36 joins the base $P_1$ of the transistor to the layer $P_2$ of the photodiode and a connection 35 joins the collector $N_2$ of the transistor to the layer $N_3$ of the photo-diode. The emitter $N_1$ is connected to the negative terminal of a source of direct supply voltage V, the collector $N_2$ being connected to the positive terminal 33 of the said source through a resistance or other load 31. The incident radiation illuminating the photo-diode $P_2N_3$ is marked by an arrow 37. Finally, the output signal is tapped off across the terminals 34 and 33 of the load 31. The direction of the supply voltage V between the terminals 32 and 33 is such that the junction $N_1$ $P_1$ is directly polarized in the forward direction, whereas the $P_1N_2$ and $P_2N_3$ junctions are inversely polarized.

According to the invention, the breakdown voltage of the $P_2N_3$ junction of the photo-diode is chosen substantially lower than that of the $P_1N_2$ base-collector junction of the transistor. The photo-diode inverse $P_2N_3$ junction breakdown voltage will thus determine the value of the supply voltage V. When the photo-diode detector $P_2N_3$ junction receives radiation 37, the radiation engenders pairs of electron holes in the detector which give rise to an effect of multiplication of the carriers in the inversely polarized $P_2N_3$ junction, which increases the reverse current of the junction.

This reverse current which is engendered by the action of radiation, is injected into the base $P_1$ of the transistor and is thus amplified by the same by a value $\beta$ corresponding to the current gain in a common emitter amplifier arrangement of the transistor. A voltage proportional to the degree of illumination of the photo-diode is thus collected at the terminals 33, 34 of the load 31. This voltage is extremely low in the absence of illumination, the reverse current of the $P_2N_3$ junction being very low due to the fact that the supply voltage V is on the order of but somewhat lower than the breakdown voltage of the p-n junction of the photo-diode as stated above.

Figure 4:
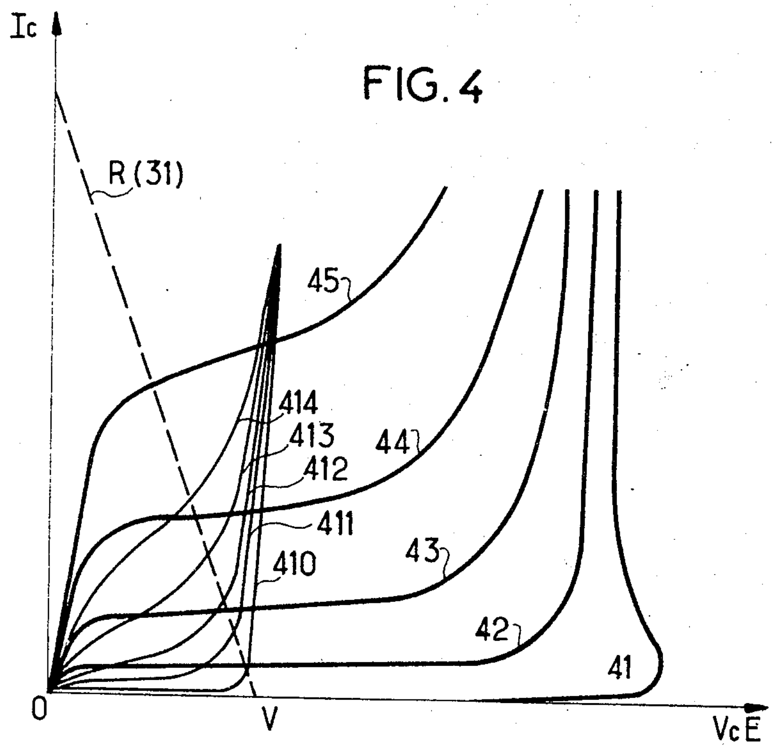
FIGURE 4 shows a series of curves illustrating the performance of the detector of FIGURE 3.

FIGURE 4 illustrates two families of curves showing the operation of the device according to FIGURE 3 and showing the operation of a transistor alone. The $V_{CE}$ collector-emitter voltages of the transistor have been plotted as abscissae, and the collector currents of the transistor have been plotted as ordinates. The curves 41, 42, 43, 44 and 45 are those corresponding to the normal operation of the transistor $N_1P_1N_2$ alone. V is the supply voltage and R is the rectilinear load line corresponding to the resistance of the load 31 of FIGURE 3. The curves 410, 411, 412, 413 and 414 are the current voltage curves of the radiation detector device comprised by the transistor $N_1P_1N_2$ and the detector $P_2N_3$ as shown in FIGURE 3. The curve 410 corresponds to the absence of radiation (darkness), and the curves 411 to 414 corresponding to increasing degrees of illumination. The intensity of the current in the resistance 31 is given by the intersection of the straight line R with each of the curves 410 to 414, for each value of illumination.

Figure 5:
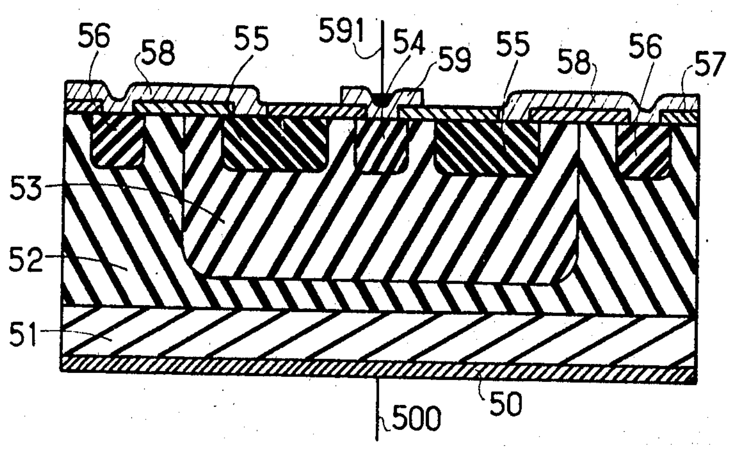
FIGURE 5 is a section through a preferred integrated circuit form of a radiation detector according to the invention.

The invention also relates to a method for producing an integrated circuit device such as that illustrated in FIGURE 5. In this figure, 51 marks a subjacent layer, for example of silicon of $N^+$ low resistivity type, on which a layer 52 of the n type, of higher given resistivity, is caused to grow by epitaxy. By application of the known techniques of screening, by means of oxide and by means of photo-sensitive varnish, a layer 53 of p type and of given resistivity is obtained by diffusion. Then by diffusion into the layer 53, layers 54 and 55 of n type of lower resistivity than that of the layer 52 are obtained, the layer 55 being annular in shape. Finally, by diffusion into the layer 52 of n type, a very high "doped" and thus low resistivity circular or rectangular-shaped layer 56 of $N^+$ type is produced. The three layers of n type of low resistivity, that is to say 54, 55 and 56 may be produced simultaneously or separately. A layer of oxide 57 is produced at the surface on certain parts only of this surface. An annular metal plating 58 renders it possible to interconnect the layers 55 and 56, the central metal plating or metallization being applied to allow a contact 591 to be established, whilst a metallization 50 produced on the layer 51 is equally intended to allow a contact 500 to be established.

In the device according to FIGURE 5, the layers 53 and 55 form the p-n junction of the photo-diode and the layers 54 and 53, respectively, form the emitter and the base of the transistor, whose collector is formed by the layers 56, 52 and 51. The metal plating 58 provides the connection between the n type layer 55 of the photo-diode and the $n^+$ type layer 56 forming part of the collector, this layer 56 being highly doped in order to provide a low-resistance connection between the photo-diode and the collector of the transistor. The annular layer 55 is that which receives the radiation. It is appartnt that the film of oxide 57 at the surface of this layer is very thin so as not to absorb the luminous radiation, whilst nevertheless providing surface protection for the said layer.

The device according to the present invention may be employed as a so-called "discrete component," in which case the connections are established as shown in FIGURE 5. It may equally form part of an integrated circuit matrix, however, consisting of a matrix or pattern of the elementary devices shown in FIGURE 5. By way of example, but in no restrictive sense, FIGURE 6 illustrates the section of such a matrix made up of 2 x 2 devices and its electrical diagram is shown in FIGURE 7.

Figure 6:
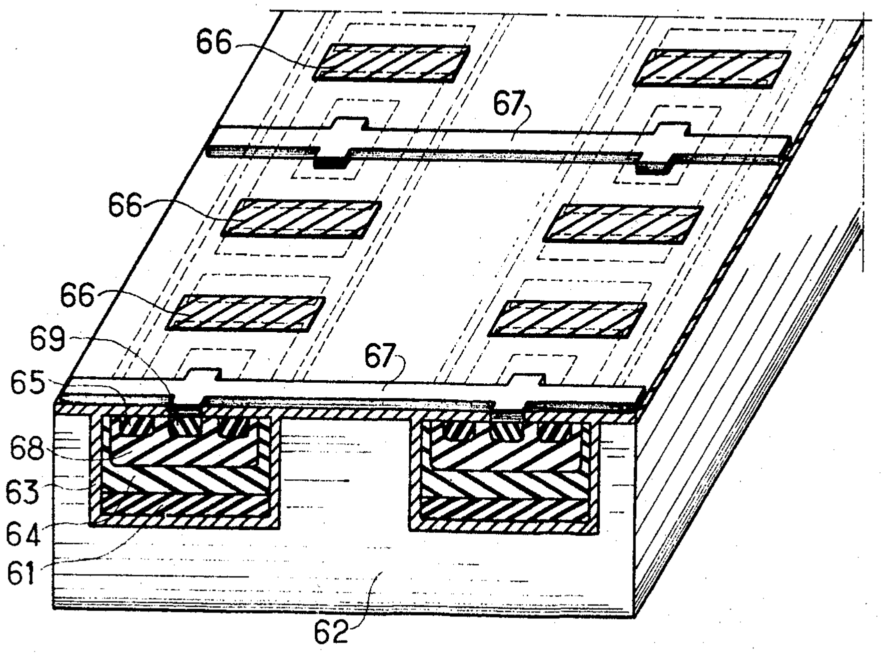
FIGURE 6 is a perspective view of a matrix of the devices illustrated in FIGURE 5.

According to FIGURE 6 "insulated trusses" joining the collectors 61 of a single line of devices similar to those of FIGURE 5 have been produced. This is achieved by means of a known method which consists of forming islets in the form of bars 64 of monocrystalline n type silicon in a support of polycrystalline silicon 62 that plays a mechanical part only, the insulation between the monocrystalline and polycrystalline substances being obtained by means of a layer of oxide 63.

The deepest layer 61 of low resistivity $N^+$ type has been obtained, for example, by diffusion on the n type monocrystalline silicon bars 64 prior to oxidation, then to epitaxic growth of polycrystalline silicon. The resulting $N^+$ layer provides a path of low resistance in the direction of the so-called isolated trusses for interconnecting the devices of the matrix in one direction as shown by the lines 61 in FIGURE 7. The bridging 66 between the collectors 61 (by way of the $N^+$ connectors 71 that correspond to the connectors 56 of FIGURE 5 and are shown in dotted lines and the layers 65 of N type of the photodiodes, as well as the connections 67 between the emitters of the same horizontal column, are produced by surface metallizations, for example of aluminum. The p type layer 68, also obtained by diffusion, is common to the photodiode and to the transistor whose base it forms, the n type layer 69 forming the emitter of the said transistor.

Figure 7:
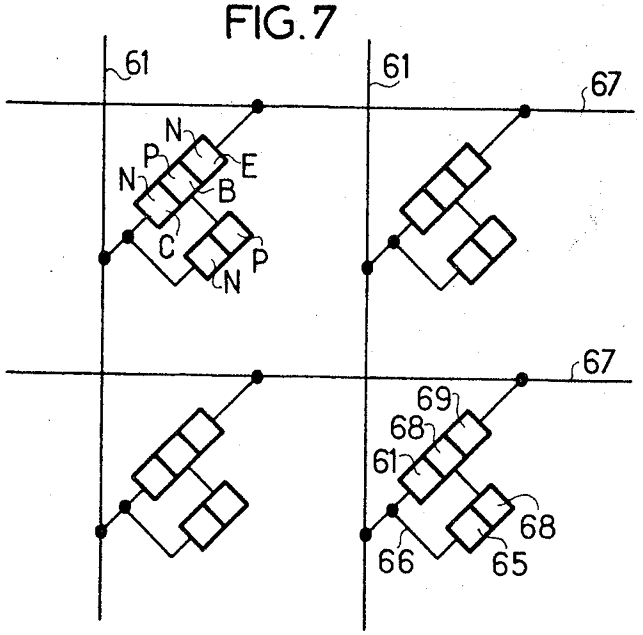
FIGURE 7 is a circuit diagram of the matrix shown in FIGURE 6.

The electrical diagram of the matrix according to FIGURE 6, is illustrated in FIGURE 7 wherein the reference numerals bear the same meaning as in FIGURE 6. It is believed apparent that the photo-diode is represented by the junction formed by the layers 65 and 68, the transistor is represented by its emitter 69, its base 68 and its collector 61. The metallization 66 provides the connection between the n layer of the junction of the photodiode and the n type collector of the transistor.

Having described several embodiments of a radiation detector constructed in accordance with the invention, it is believed obvious that other modifications and variations of the present invention are possible in the light of the above teachings. It is therefore to be understood that changes may be made in the particular embodiments of the invention described which are within the full intended scope of the invention as defined by the appended claims.

We claim:

1. A radiation detector comprising a transistor having an emitter, base and collector defining two opposed p-n junctions, a semiconductor p-n junction photo-diode having the p-n junction thereof connected between the base and the collector of the transistor, the breakdown voltage of the p-n junctions of the transistor being higher than the breakdown voltage of the p-n junction of the photo-diode and means for supplying an energizing voltage to said detector having a magnitude slightly below the breakdown voltage of the photo-diode and a polarity which forwardly biases the emitter-base of the transistor and inversely biases the p-n junction of the photo-diode.

2. A detector of radiation as claimed in claim 1, in which the transistor and the photo-diode are formed by an integrated device in which the base layer of the transistor also forms one of the two layers of the p-n junction of the said photo-diode, the other layer of the said junction which forms the surface sensitive to radiation being connected to the collector of the said transistor by a metallized layer.

3. A detector of radiation of integrated construction as claimed in claim 2 and combined into a matrix formed by interconnecting a plurality of such detectors in which insulated truss members of monocrystalline semiconductor substance are formed in a polycrystalline semiconductor substance providing physical support for the matrix, the two substances being separated by a layer of oxide, each said truss members serving to electrically interconnect the collectors of the transistors of a desired number of integrated radiation detectors the emitters of the transistors being interconnected by metallized bridge members according to the pattern which is to be imparted to the matrix.

4. A method of producing an integrated detector of radiation employing a photo-detector diode and transistor as claimed in claim 2 wherein the said other layer of the p-n junction photo-diode connected to the collector of the transistor by a metallized layer and the layer comprising the emitter of the transistor are formed in a single operation.

5. A method as claimed in claim 4 wherein an additional enriched layer of the same conductivity type as the collector is formed on the collector of the said transistor to provide good electrical contact to the collector and is produced in the course of the said single operation.

6. A radiation detector according to claim 1 wherein the transistor is a n-p-n junction transistor and the p-n junction semiconductor photo-diode has its p layer connected to the p base layer of the transistor and has its n layer connected to the n collector layer of the transistor.

7. A detector of radiation as claimed in claim 6 in which the transistor and the photo-diode are formed together in a single integrated circuit structure and wherein the p base layer of the transistor also comprises the p layer of the photo-diode and a metallized layer interconnects the n layer of the photo-diode with the n collector layer of the transistor.

8. A method of producing an integrated detector of radiation employing a photo-detector diode and transistor as claimed in claim 7 wherein the n layer of the photo-diode and the n emitter layer of the transistor are formed in a single operation.

9. A method as claimed in claim 8 wherein an additional enriched $n^+$ contact layer is formed on the n collector layer of the transistor to provide good electrical contact to the collector and is produced in the course of the said single operation.

References Cited

UNITED STATES PATENTS

| | | |
|---|---|---|
| 2,745,021 | 5/1956 | Kurshan. |
| 2,779,877 | 1/1957 | Lehovec. |
| 3,046,405 | 7/1962 | Emeis. |
| 3,079,512 | 2/1963 | Rutz. |
| 3,378,688 | 4/1968 | Kabell. |

OTHER REFERENCES

Anderson, L. K.: At the End of the Laser Beam, a More Sensitive Photodiode, May 30, 1966, Electronics, pp. 94–98, vol. 39, No. 11.

RALPH G. NILSON, *Primary Examiner.*

BRUCE L. ADAMS, *Assistant Examiner.*

U.S. Cl. X.R.

317—235